Oct. 9, 1928.
C. M. FANNIN
1,686,741
TIRE RACK
Filed Feb. 3, 1927
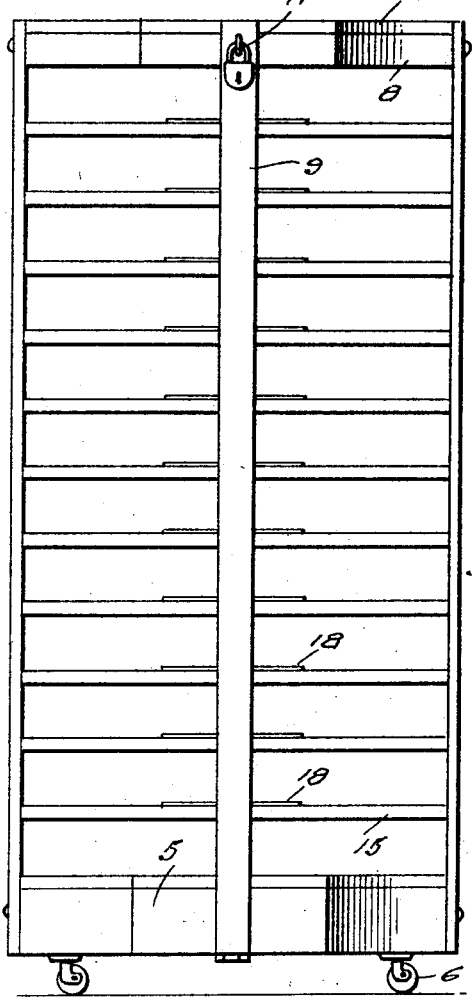
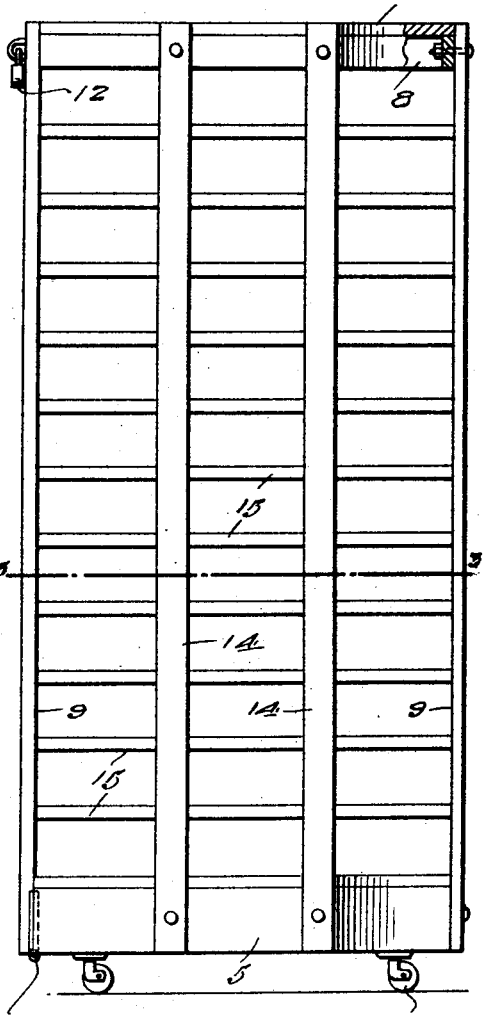
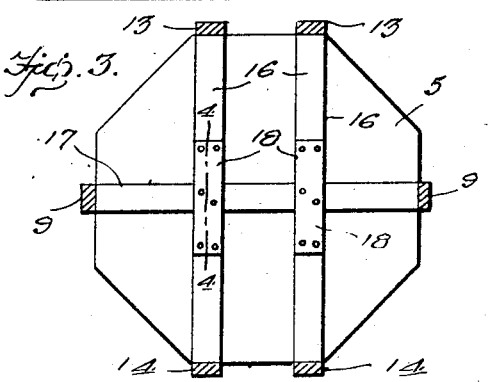
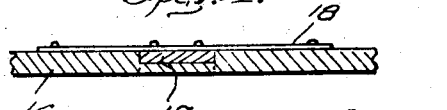
Inventor
Charles M. Fannin
By Clarence A. O'Brien
Attorney Patented Oct. 9, 1928.

1,686,741

UNITED STATES PATENT OFFICE.

CHARLES M. FANNIN, OF WINONA, WEST VIRGINIA.

TIRE RACK.

Application filed February 3, 1927. Serial No. 165,671.

This invention relates to new and useful improvements in tire racks and aims to provide a device of this character wherein a plurality of tires may be disposed in horizontal rality of position within the rack and in such a manner as to permit the same to be readily viewed by the public.

The invention further aims to provide a tire rack that may be readily moved from place to place and wherein the tires may be locked therein or readily removed therefrom when the rack is unlocked.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a front elevation of a tire rack constructed in accordance with the present invention.

Figure 2 is a side elevation partly in cross section.

Figure 3 is a reduced horizontal section taken substantially upon the line 3—3 of Figure 2, and Figure 4 is a fragmentary horizontal section taken substantially upon the line 4—4 of Figure 3 for disclosing more clearly the connecting means between the cross bars of one of the rack shelves.

Now having particular reference to the drawing, my novel rack consists of a heavy base 5, preferably in the form of a wooden block of octagon shape and upon the under side of which are swivel supporting casters 6 to permit the rack to be readily moved from place to place. The invention further consists of a top wall 7 also of octagon shape and provided at its edge with a depending rim 8. Interconnecting the base 5 and top wall 7 at the front and rear side of the rack are vertical bars 9—9, one of the bars being hingedly secured at its lower end as at 10 to the base 5 and having a slot in its upper end through which a loop 11 attached to the top wall flange 8 will pass when this bar is swung upwardly so that the same may be locked to the top wall by a pad lock 12.

Further interconnecting the base 5 and top wall 7 at points intermediate the bars 9—9 are similar spaced bars 13—13, 14—14, the same being preferably secured to the base and flange of the top wall at the edges of opposed bases thereof as clearly disclosed in Figure 3.

Arranged between the base and top wall and secured in any desirable manner to the stationary bars 9, 13—13 and 14—14 are horizontal tire supporting shelves 15. Each shelf consists of a pair of narrow boards 16—16 extending in parallel spaced relation between the side bars 13—13 and 14—14 and extending across which is a right angular narrow board 17 secured at one end to the rigid bar 9 of the rack. The bar 17 has interfitting relation with the parallel bars 16—16 as indicated in Figure 4, and arranged upon the top of each board 16—16 over the cross board 17 is a metal strap 18 for reinforcing purposes.

It will be obvious that when the bar 9 is unlocked at its upper end and swung downwardly tires may be deposited on or removed from the various shelves 15, and that furthermore when the tires are arranged upon the shelves the same may be readily viewed by the public and furthermore the same may be readily moved from place to place by merely rolling the rack to the desired point.

Furthermore, when the hinged bar 9 is locked, it will be impossible to remove the tires from the rack.

Having thus described the invention, what I claim is:—

In a tire rack of the class described, a base, a vertically spaced top, pairs of stationary bars arranged vertically at the sides of the rack and inter-connecting the base and the top, a stationary vertical bar at the rear of the rack, extending from the top to the bottom thereof, a hinged vertical bar at the front of the rack also extending from the top to the bottom thereof, horizontal spaced tire supporting shelves arranged between the base and the top, said shelves comprising bars secured at their ends to the adjacent vertical side bars, the intermediate portion of each of said bars being formed with a transverse notch in its upper face, additional horizontal bars disposed transversely across the first mentioned horizontal bars for disposition in said notches whereby the intersecting bars have their upper faces disposed in the same plane, said last mentioned horizontal bars being secured at one end of the stationary rear vertical bar, the free ends of said bars adapted to engage the hinged front bar when the latter is disposed vertically, and reinforcing metallic strips extending across the intersecting portions of the horizontal bars and secured thereto, and means for locking the free end of the hinged vertical front bar in a closed position.

In testimony whereof I affix my signature.

CHARLES M. FANNIN.